(12) United States Patent
Ranjan et al.

(10) Patent No.: US 11,868,443 B1
(45) Date of Patent: Jan. 9, 2024

(54) SYSTEM FOR TRAINING NEURAL NETWORK USING ORDERED CLASSES

(71) Applicant: AMAZON TECHNOLOGIES, INC., Seattle, WA (US)

(72) Inventors: Rajeev Ranjan, Seattle, WA (US); Prithviraj Banerjee, Redmond, WA (US); Manoj Aggarwal, Seattle, WA (US); Gerard Guy Medioni, Los Angeles, CA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 230 days.

(21) Appl. No.: 17/302,770

(22) Filed: May 12, 2021

(51) Int. Cl.
*G06F 18/2431* (2023.01)
*G06N 3/08* (2023.01)
(Continued)

(52) U.S. Cl.
CPC ........ *G06F 18/2431* (2023.01); *G06F 18/214* (2023.01); *G06F 18/2113* (2023.01); *G06N 3/045* (2023.01); *G06N 3/08* (2013.01)

(58) Field of Classification Search
CPC ............ G06F 18/2431; G06F 18/2113; G06F 18/214; G06F 18/24323; G06F 18/24; G06F 18/217; G06F 18/241; G06F 18/2155; G06F 18/24317; G06N 3/045; G06N 3/08; G06N 20/00; G06N 3/04; G06N 5/01; G06N 20/20; G06N 5/022; G06N 3/048; G06N 3/063; G06N 3/084; G06N 7/01; G06N 20/10; G06V 10/82; G06V 10/764; G06V 10/454; G06V 10/25; G06V 20/52;
(Continued)

(56) References Cited

U.S. PATENT DOCUMENTS 10,979,461 B1* 4/2021 Cervantez ............. H04L 63/105
11,507,797 B2* 11/2022 Motoya ..................... G06N 3/08
(Continued)

OTHER PUBLICATIONS

"BCELOSS", PyTorch, 2019 Torch Contributors, 2 pgs. Retrieved from the Internet: URL: https://pytorch.org/docs/stable/generated/torch.nn.BCELoss.html.
(Continued)

*Primary Examiner* — Michael S Osinski
(74) *Attorney, Agent, or Firm* — Lindauer Law, PLLC

(57) ABSTRACT

A neural network is trained to process input data and generate a classification value that characterizes the input with respect to an ordered continuum of classes. For example, the input data may comprise an image and the classification value may be indicative of a quality of the image. The ordered continuum of classes may represent classes of quality of the image ranging from "worst", "bad", "normal", "good", to "best". During training, loss values are determined using an ordered classification loss function. The ordered classification loss function maintains monotonicity in the loss values that corresponds to placement in the continuum. For example, the classification value for a "bad" image will be less than the classification value indicative of a "best" image. The classification value may be used for subsequent processing. For example, biometric input data may be required to have a minimum classification value for further processing.

20 Claims, 5 Drawing Sheets

(51) Int. Cl.
*G06F 18/214* (2023.01)
*G06F 18/2113* (2023.01)
*G06N 3/045* (2023.01)

(58) Field of Classification Search
CPC .... G06V 10/62; G06V 10/774; G06V 10/776; G06V 10/94; G06T 2207/20081; G06T 2207/20084; G06T 2207/30096; G06T 2207/30232; G06T 7/0012; G06T 7/11
See application file for complete search history.

(56) References Cited

U.S. PATENT DOCUMENTS

| | | | | |
|---|---|---|---|---|
| 11,625,555 | B1* | 4/2023 | Zhiyanov | G06F 18/214 706/20 |
| 11,640,470 | B1* | 5/2023 | Amar | G06N 20/20 726/22 |
| 2003/0174881 | A1* | 9/2003 | Simard | G06V 10/454 382/159 |
| 2017/0344808 | A1* | 11/2017 | El-Khamy | G06V 40/161 |
| 2018/0018555 | A1* | 1/2018 | Wong | G06N 3/105 |
| 2018/0101748 | A1* | 4/2018 | Yang | G06F 18/24 |
| 2018/0329935 | A1* | 11/2018 | Mugali | G06F 16/25 |
| 2019/0102658 | A1* | 4/2019 | Wang | G06N 3/08 |
| 2019/0156192 | A1* | 5/2019 | Dasgupta | G06V 10/764 |
| 2019/0171913 | A1* | 6/2019 | Cheng | G06N 5/01 |
| 2019/0347485 | A1* | 11/2019 | Yang | G06F 18/253 |
| 2020/0034691 | A1* | 1/2020 | Mixter | G06N 3/04 |
| 2020/0090005 | A1* | 3/2020 | Ghosh | G06F 18/24323 |
| 2020/0110930 | A1* | 4/2020 | Simantov | G06N 20/00 |
| 2020/0234068 | A1* | 7/2020 | Zhang | G06F 18/2413 |
| 2020/0311800 | A1* | 10/2020 | Srinivasan | G06F 16/953 |
| 2020/0400441 | A1* | 12/2020 | Efland | G01C 21/387 |
| 2020/0401851 | A1* | 12/2020 | Mau | G06V 10/454 |
| 2021/0216777 | A1* | 7/2021 | Chaudhury | G06F 18/2163 |
| 2021/0216831 | A1* | 7/2021 | Ben-Itzhak | G06F 18/2155 |
| 2021/0279525 | A1* | 9/2021 | Goyal | G06V 10/776 |
| 2021/0279784 | A1* | 9/2021 | Wu | G06T 7/70 |
| 2021/0312288 | A1* | 10/2021 | Wang | G06N 3/045 |
| 2021/0397927 | A1* | 12/2021 | Chen | G06N 3/063 |
| 2022/0004863 | A1* | 1/2022 | Park | G16H 50/20 |
| 2022/0101148 | A1* | 3/2022 | Lin | G06N 20/20 |
| 2022/0301712 | A1* | 9/2022 | Kim | G16H 50/20 |
| 2022/0327218 | A1* | 10/2022 | Bishop, III | G06F 21/577 |
| 2022/0327804 | A1* | 10/2022 | Meardi | B60L 53/30 |
| 2022/0366298 | A1* | 11/2022 | Polleri | G06N 20/00 |
| 2023/0005268 | A1* | 1/2023 | Tamura | G06V 10/62 |
| 2023/0014551 | A1* | 1/2023 | Chang | G06F 18/2431 |
| 2023/0025770 | A1* | 1/2023 | Lee | G06V 20/58 |
| 2023/0143701 | A1* | 5/2023 | Bauchet | G06V 10/75 382/128 |
| 2023/0153600 | A1* | 5/2023 | Ozcan | G02B 27/4272 706/40 |
| 2023/0229639 | A1* | 7/2023 | McCreary | G06N 20/00 707/756 |

OTHER PUBLICATIONS

Gomez, Raul, "Understanding Categorical Cross-Entropy Loss, Binary Cross-Entropy Loss, Softmax Loss, Logistic Loss, Focal Loss and all those confusing names", Raul Gomez blog, May 23, 2018, 15 pgs. Retrieved from the Internet: URL: https://gombru.github.io/2018/05/23/cross_entropy_loss/.

Goodfellow, Ian, et al., "Deep Learning" Adaptive Computation and Machine Learning series, MIT Press, 2016, Chapter 6, pp. 164-223. Retrieved from the Internet: URL: https://www.deeplearningbook.org/.

* cited by examiner

SYSTEM FOR TRAINING NEURAL NETWORK USING ORDERED CLASSES

BACKGROUND

Training data may be used to train a neural network to associate a class with input data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
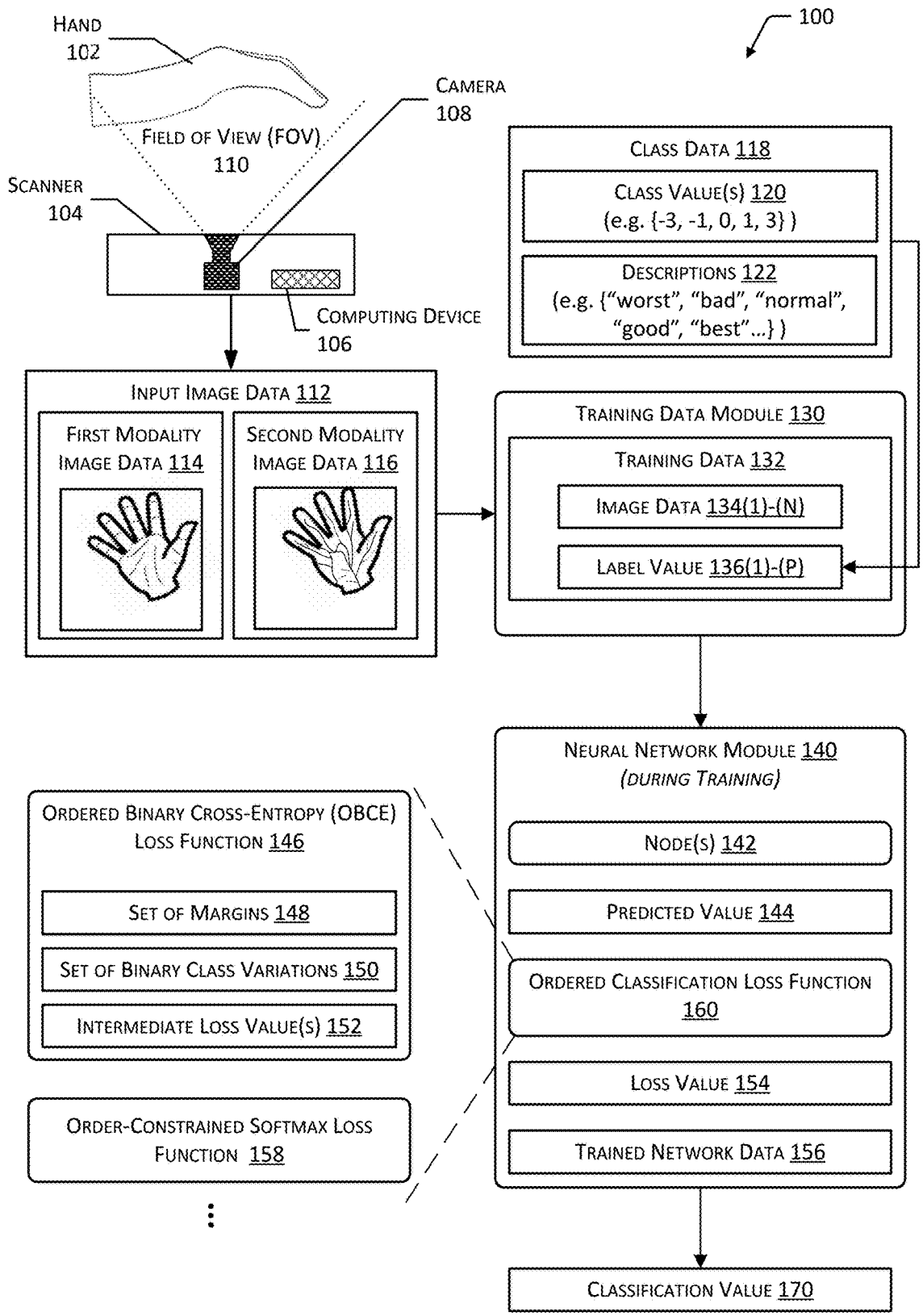
FIG. 1 illustrates a system to train a neural network using an ordered binary cross-entropy (OBCE) loss function to determine a classification value of image data that may be used for biometric identification of a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data may be associated with a class to facilitate subsequent processing. In one implementation, input data may comprise input image data acquired by a biometric input device. The input image data may depict a hand of a user. Quality of the input image data may vary based on a variety of factors such as focus, lighting, pose, orientation, occlusion due to attire, and so forth. For example, input image data that is associated with a "best" class may depict a hand that is in focus, evenly lit, in a specified pose and orientation, with the palm clearly visible. In comparison, input image data that is associated with a "worst" class may depict a hand that is out of focus, has highlights and shadows, has the fist closed, and a sleeve obscuring part of the palm.

Determining a classification value that is representative of the quality of the input image data may be used to facilitate subsequent processing, such as attempting to determine an identity of the user depicted in the input image data. For example, if the classification value is less than a threshold value, the user may be prompted to present their hand again to acquire additional input image data. If the classification value is greater than or equal to the threshold value, the system may process the input image data to determine embedding vector data and compare that with previously enrolled user data to assert an identity.

The classification value may be determined using a neural network that has been trained to process the input data and provide as output the classification value. The training process utilizes training data that comprises image data and associated label values. The label values are values that may be assigned by a human annotator who views the images and provides annotations that assign a label value.

Several types of annotations may be used to develop the label values. Type 1 annotations involve presenting a pair of images to an annotator who then selects the "better" image. Type 2 annotations present an image to the annotator who assigns one of the predetermined classes. Type 3 annotations present an image to many annotators, each assigning one of the predetermined classes. These results are then combined by a mean or median of the labels from all the annotators.

Type 1 annotations have a relatively high precision but are extremely time intensive because of the large number of samples that must be reviewed and are thus costly to obtain. Type 2 annotations require far fewer samples than type 1 annotations, making them less costly to obtain than type 1 annotations. However, type 2 annotations have relatively low precision. Type 3 annotations require more annotators, making them more costly to obtain than type 2 annotations. The overall time spent to determine type 3 annotations is less than type 1 annotations, so type 3 annotations are generally less costly than type 1 annotations. Type 3 annotations have a relative precision that is intermediate between type 1 and type 2 annotations.

Type 2 annotations are generally preferred for developing training data, due to the relatively low cost to obtain. However, their relatively low precision introduces problems. Traditionally, a cross-entropy (CE) loss function has been used to train a neural network with each class of quality being associated with a separate bin. However, a neural network trained using the CE loss function has substantial drawbacks: it cannot distinguish between similar looking images and it also produces unsuitable output with high error rates. This results from the inability for the CE loss function to account for the relative difference between classes during training. For example, with a traditional CE loss function the magnitude of the loss is the same for a misclassification of a "best" image as a "worst image" compared to a "best" image that is misclassified as "good". One approach to attempt to mitigate these drawbacks is the use of type 1 annotations. However, as mentioned above, type 1 annotations are expensive to produce.

Described in this disclosure is an ordered classification loss function that takes into consideration an ordered arrangement of classes with respect to a continuum of classes. For example, the continuum of classes for a quality assessment may specify five classes ordered from "worst", "bad", "normal", "good", to "best". The resulting output of a neural network trained using the ordered classification loss function is a classification value that is a scalar that is monotonic in value across the continuum of classes. For example, the ordered classification loss function results in the classification value monotonically increasing from the "worst" to the "best".

In operation, the continuum of classes is divided into a set of ordered classes. A set of margins indicate the boundary between adjacent classes of the set of ordered classes. In one implementation, the ordered classification loss function may comprise an ordered binary cross entropy (OBCE) loss function. With the OBCE loss function, based on the set of margins, a plurality of binary class variations is determined. The binary class variations subdivide the set of ordered classes into a set of binary classes. For example, with 5 classes and 4 margins, there would be 4 binary class variations. During training, intermediate loss values are calculated for each of the binary class variations. Those intermediate loss values may then be used to determine a loss value.

In another implementation, the ordered classification loss function may implement an order-constrained Softmax loss function. The order-constrained Softmax loss function modifies the Softmax function to take into consideration the relative placement within the continuum of a sample.

Once trained using an ordered classification loss function, during inference the neural network may accept input image data and provide a scalar classification value that is indicative of a quality of the input image data. The classification value for each image may then be used for subsequent processing. For example, input image data having a classification value that is less than a threshold may be disregarded from further processing. The classification values of a set of input image data may be assessed, allowing selective subsequent processing of those images with relatively better quality. For example, ten images of a user's hand may be acquired. Three of these images may have a classification value less than the threshold value, and so are disregarded. The remaining seven are sorted in descending order by classification value. The top five images, as sorted by classification value, may then be used for subsequent processing to attempt to determine an identity of the user.

By using the ordered classification loss function, type 2 annotation data may be used to train a neural network to classify input data with high accuracy. This allows for significant cost reductions in the development of training data. The classification values produced by the trained neural network provide highly reliable information about the relative classification, allowing distinction between multiple instances of input data. For example, two similar images may be compared and usable classification values determined to allow for selection of one of those two images. The classification values may then be used to facilitate processing by subsequent systems.

Illustrative System

FIG. 1 illustrates a system 100 to train a neural network using an ordered classification loss function to determine a classification value, according to some implementations. The system 100 is described as being used to facilitate the determination of an identity of a user. However, the ordered classification loss function may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

Quality of the input image data 112 may vary for a variety of reasons such as focus, lighting, pose, orientation, occlusion, and so forth. For example, the hand 102 may be moved through the FOV 110 too quickly, resulting in a blurred image. In another example, the hand 102 may be tilted away from the scanner 104. In yet another example, the hand 102 may be partially obscured by clothing, such as a shirt cuff blocking part of the palm.

The ability to characterize the quality of the input image data 112 may be used to determine whether to discard or use input image data 112 for subsequent operations, such as identifying the user associated with the hand 102. For example, input image data 112 that is of insufficient quality may be discarded. This improves overall system performance by preventing the use of computing resources to process input image data 112 that is inadequate for use. The accuracy of identification is also improved by preventing low quality input image data 112 from being presented.

To characterize input data a neural network module 140 is trained to provide as output a classification value 170. In the implementation depicted here, the input data may comprise input image data 112 and the classification value 170 may be indicative of a quality of the image. The classification may be representative of one or more of focus, lighting, pose, orientation, occlusion, and so forth. The classification value 170 produced by the neural network module 140 may monotonically increase with respect to location within an ordered continuum of classes. For example, the ordered continuum of classes may extend from "worst" to "bad" to "normal" to "good" to "best". Within this ordered continuum a first classification value 170 that is within the class of "worst" is less than a second classification value 170 that is within the class of "best".

The neural network module 140 comprises a plurality of nodes 142. For example, the nodes 142 may comprise artificial neurons within a feed-forward neural network architecture. During training of the neural network module 140, training data 132 is utilized. The training data 132 comprises a set of image data 134(1)-(N) and associated label values 136(1)-(P). For example, the training data 132 may comprise 1,000 images, with each image having an associated label value 136 that is indicative of a class within the ordered continuum of classes. In some implementations the image data 134 may comprise synthetic data. For example, synthetic image data 134 may be generated by another neural network.

Class data 118 may specify class values 120 and have associated descriptions 122. For ease of discussion, the class values 120 and their associated descriptions 122 may be expressed with the notation {class_value1, description1; class_value2, description 2; . . . }. For example, the class data 118 for a system being trained to assess image quality may have classes and associated class values 120 as follows: {−3, "worst"; −1, "bad"; 0, "normal"; 1, "good"; 3, "best"}.

A training data module 130 may use the class data 118 to determine the training data 132. For example, image data 134 comprising a plurality of images may be presented to an annotator. The annotator may then specify, for a particular image in the image data 134, a label value 136 that indicates the annotator's opinion as to the class value 120. The training data module 130 may implement type 2 annotations. For example, each portion of input data such as image data 134 of a single image is assessed by a single annotator. The use of type 2 annotations allows for rapid annotation of the image data 134 or other exemplary input data to be used to train the neural network module 140.

During training, the neural network module 140 processes at least a portion of the training data 132 to determine trained network data 156. The trained network data 156 may comprise one or more of values that are associated with individual nodes 142 within one or more of feature layers, classification layers, or other layers of the neural network module 140. For example, the trained network data 156 may comprise information indicative of relative weights to be assigned to specific nodes 142 within feature layers. The output from the neural network module 140 is a classification value 170. The classification value 170 comprises information that is representative of a location within an ordered continuum of classes indicated by the class values 120.

During training, the neural network module 140 receives and processes the image data 134 with the plurality of nodes 142 to determine a predicted value 144. An ordered classification loss function 160 is used to determine a loss value 154 that represents the variation between the predicted value 144 and the label value 136 associated with the image data 134. This loss value 154 is then provided back to the nodes 142 to train the nodes 142 for subsequent processing of the next image data 134. After a plurality of iterations, the modification of the weights, bias values, and so forth of the nodes 142 results in the trained network data 156.

The ordered classification loss function 160 may comprise an ordered binary cross-entropy (OBCE) loss function 146, an order-constrained Softmax loss function 158, or other function.

The OBCE loss function 146 utilizes a set of margins 148. The set of margins 148 comprises margins, with each margin specifying a boundary between adjacent classes in the continuum of classes. For example, a first margin "m1" is specified at the boundary between the classes "worst" and "bad", a second margin "m2" is specified at the boundary between the classes "bad" and "normal", and so forth.

A set of binary class variations 150 are determined based on the set of margins 148. The set of binary class variations 150 comprises a plurality of binary class variations. Each binary class variation is a different permutation of subdividing the set of ordered classes at one of the margins into a first binary class and a second binary class. For example, with 5 classes and 4 margins, there would be 4 binary class variations in the set of binary class variations 150. This is discussed in more detail with regard to FIG. 3.

The OBCE loss function 146 calculates a plurality of intermediate loss values 152. Each intermediate loss value 152 is calculated from one of the binary class variations. For example, with 4 binary class variations, 4 intermediate loss values 152 would be calculated. The intermediate loss values 152 may then be used to determine the loss value 154. The intermediate loss values 152 may be summed to determine the loss value 154.

One implementation of the OBCE loss function 146 is:

$$L_{OBCE} = -\frac{1}{M}\sum_{i=1}^{M}\sum_{j=1}^{C-1}\left(\mathbb{1}_{j\geq y_i}\log\frac{1}{1+e^{(g(x_i)-m_j)}} + \mathbb{1}_{j<y_i}\log\frac{1}{1+e^{-(g(x_i)-m_j)}}\right)$$

where:
 $L_{OBCE}$ is the ordered binary cross entropy loss value 154,
 M is a batch size of samples being processed,
 C is the total number of classes specified by the class data 118,
 i is an index indicative of the sample image data 134,
 j is an index indicative of a class in the class data 118,
 $y_i$ is the label value 136 associated with sample $x_i$,
 $g(x_i)$ is the predicted value 144,
 $m_j$ is value of the $i^{th}$ margin,
 $\mathbb{1}_{j\geq y_i}$ is an intermediate loss value 152 for the condition in which $j \geq y_i$, and
 $\mathbb{1}_{j<y_i}$ is an intermediate loss value 152 for the condition in which $j < y_i$.

The OBCE loss function 146 provides several advantages during operation. The OBCE loss function 146 results in a classification value 170 that is a scalar with monotonicity across the continuum of classes. For example, in the situation depicted in which the classification value 170 is trained to be indicative of quality, a classification value 170 of "−2" has a lower quality than a classification value of "−1.9".

The OBCE loss function 146 also enforces maximum separability between adjacent classes. This results from the consideration of the ordering of the continuum of classes in the OBCE loss function 146. As a result, during operation there is a distinction made within the OBCE loss function 146 and in the resulting loss value 154 for situations where input data corresponds to an edge of a class. Operation of the OBCE loss function 146 is discussed in more detail with regard to FIG. 3.

The order-constrained Softmax loss function 158 also utilizes the continuum of classes, such as indicated by the class values 120. The order-constrained modifies the Softmax function to take into consideration the ordered continuum of classes. One implementation of the order-constrained Softmax loss function 158 is described with respect to equations 2 and 3:

$$p_i = \frac{\exp(-(w_{\{i\}}-x)^2)}{\exp(-(w_{\{1\}}-x)^2) + \exp(-(w_{\{2\}}-x)^2) + \exp(-(w_{\{3\}}-x)^2)}$$

where:
 $p_i$ is a Softmax probability value,
 i is the class being tested,
 x is the predicted value 144 of the sample,
 y is label value 136 associated with the sample, and
 $w_i$ is classifier weight that is based on a center of a class.

$$L_{ocs} = \sum_{k=0}^{n} -y\{k\}\log(p\{k\})$$

where:
 $L_{ocs}$ is the ordered-constrained Softmax loss value 154, and
 k is the class, n is the total number of classes.

With regard to the order-constrained Softmax loss function 158, the separation between classes within the continuum of classes is maintained. This substantially reduces the likelihood that a given sample will be misclassified. For example, a sample that is associated with the "good" class will be unlikely to be misclassified as belonging to the "bad" class, due to their separation within the continuum of classes.

The use of the ordered classification loss functions 160 provides other advantages. For example, a continuous regression-based classification value 170 may be obtained without annotating any regression targets. This provides useful information to understanding how the predicted value 144 provided by the neural network module 140 varies across samples. This information may be used to determine thresholds to improve one or more false acceptance ratios or false rejection ratios.

Figure 2:
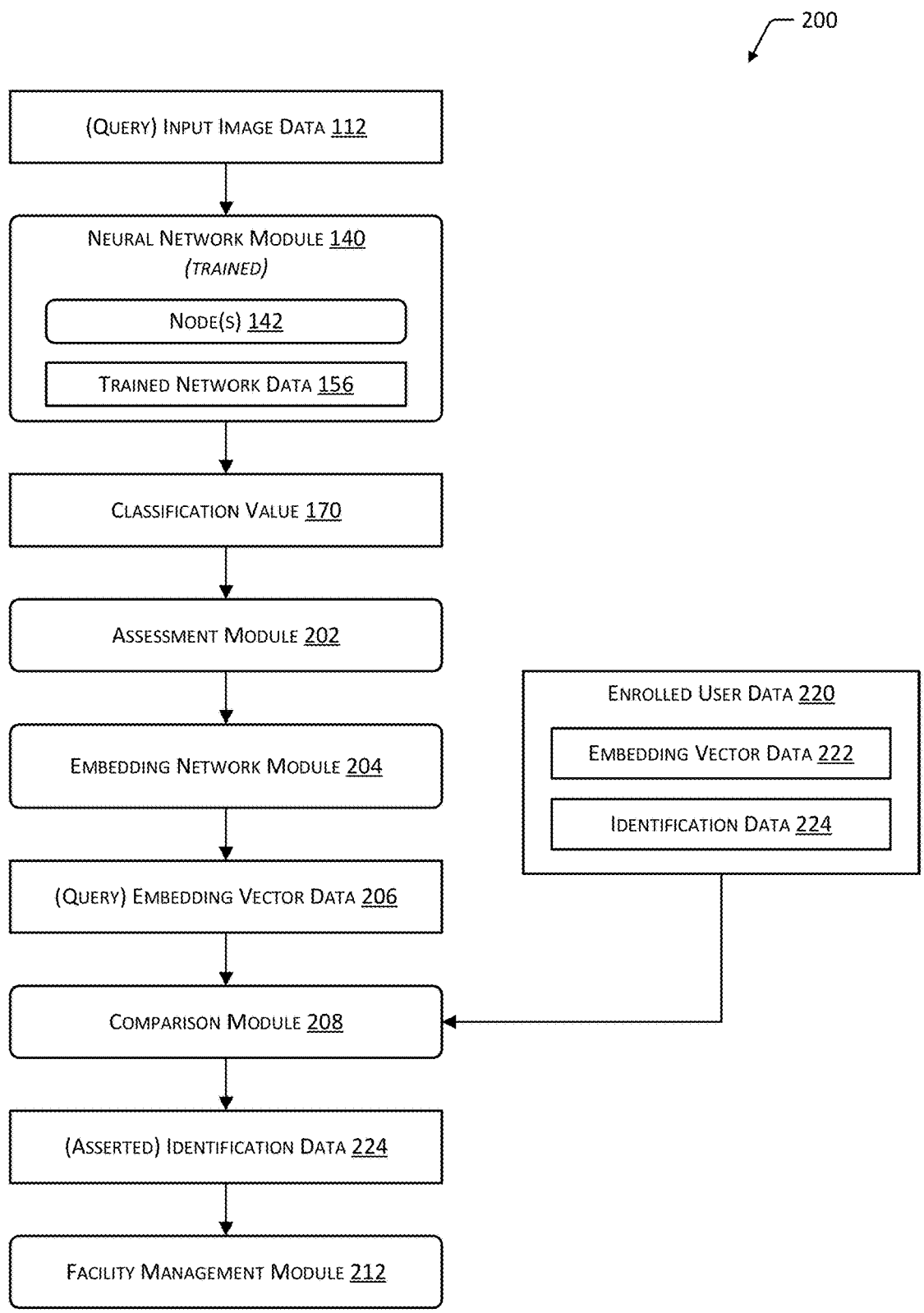
FIG. 2 illustrates a flow diagram of use of the trained neural network for determining a classification value indicative of a quality of an input image and the subsequent use of that input image for biometric identification, according to some implementations.

FIG. 2 illustrates a flow diagram 200 of use of the trained neural network module 140 of FIG. 1 to determine a classification value 170 indicative of a quality of an input image and the subsequent use of that input image for biometric identification, according to some implementations.

Once training is complete, the neural network module 140 comprising nodes 142 that are arranged into feature layers, classification layers, and so forth have one or more parameters thereof specified by the trained network data 156. For example, the trained network data 156 may comprise values specifying weights to be associated with one or more nodes 142 or neurons within the feature layers. While operating in an inference mode, query input image data 112 is provided and the system 200. The query input image data 112 is processed by the neural network module 140 to determine the classification value 170 of that query input image data 112.

An assessment module 202 may compare the classification value 170 to one or more thresholds and determine whether the query input image data 112 is suitable for further processing. In one implementation, if the classification value 170 is greater than or equal to a threshold value, the query input image data 112 may be deemed suitable for further processing. Continuing this example, the query input image data 112 may be provided to an embedding network module 204 for further processing. If the classification value 170 is less than the threshold value, the query input image data 112 may be disregarded. Other operations may then be performed. For example, a user interface may provide output to request that the user present their hand 102 again to the scanner 104 to gather additional query input image data 112. In some implementations, based on the classification value 170 particular prompts may be presented in the user interface. For example, the prompts may indicate "please hold your hand flat with the fingers apart", "please keep your hand horizontal", "please pull up your sleeve cuff", and so forth.

In some implementations the assessment module 202 may process a set of query input image data 112 and their corresponding classification values 170. For example, the scanner 104 may acquire a set of 30 images, each of first modality image data 114 at a different time. Each image is processed by the neural network module 140 to determine an associated classification value 170.

To select which input image data 112 to further process, one or more sorts or filters may be applied. In one implementation, the set of images may be sorted in descending order by their associated classification values 170. The top k images (where k is a positive integer) may then be selected and subsequently sent for further processing by the embedding network module 204. Other comparisons may also be used alone or in combination. For example, the sorted list may be limited to those images that have a classification value 170 greater than some minimum threshold. Continuing the example, input image data 112 having a classification value 170 that is less than a minimum threshold value may be disregarded, and the remaining set of input image data 112 and their associated classification values 170 may then be sorted in descending order by classification value 170.

The query input image data 112 that is deemed suitable by the assessment module 202 may then be passed on to other modules in the system 200 for further processing. In the implementation depicted here, the input image data 112 comprises biometric input data. This biometric input data may be used to determine an asserted identity that is associated with the hand 102.

During an enrollment process, the user may opt in to use the system 200 and presents their hand 102 to produce input image data 112. Enrolled user data may be stored that comprises one or more of previously acquired input image data 112, associated embedding vector data 222, identification data 224, and may include additional information. The identification data 224 may comprise a name, government issued identification value, assigned identification value, or other information. The additional information may comprise name, contact information, demographic data, payment account information, and so forth. The embedding vector data 222 may act as a "signature" that is uniquely associated with the identity of the user. During the enrollment process, a comparison module 208 may be used to determine whether the user has been previously enrolled.

During subsequent usage, the (as yet unidentified) user presents their hand 102 at a scanner 104. The resulting input image data 112 may be processed by an image processing module to determine processed image data. For example, the processed image data may comprise a canonical version of the query input image data 112. The processed image data is then provided as input to the trained embedding network module 204.

The trained embedding network module 204 processes the processed image data and provides as output query embedding vector data 206. The query embedding vector data 206 is then provided to a comparison module 208. The comparison module 208 compares the query embedding vector data 206 to the embedding vector data 222 stored in the enrolled user data 220 to determine asserted identification data 224. In one implementation, the asserted identification data 224 may comprise a user identifier associated with the closest embedding vector data 222 in the enrolled user data 220 to the query embedding vector data 206 associated with the user who presented their hand 102.

The comparison module 208 may determine distances between the point in a vector space that is associated with the query embedding vector 206 for the user to be identified and points associated with other embedding vectors represented in the enrolled user data 220. In one implementation, the comparison module 208 may assert the identity that corresponds to the embedding vector data 222 of a previously enrolled user that is closest in vector space to the query embedding vector data 206. Other thresholds and comparison may be used in some implementations.

The identification data 224 may provide information such as one or more of a user identifier associated with the user, a location or identification of the scanner 104, data indicative of date and time that the input image data 112 was obtained, and so forth. The asserted identification data 224 may be subsequently used for various purposes. In some implementations, the asserted identification data 224, or information associated with the asserted identification data 224, may be provided to another system, such as a facility management module 212. For example, if the user has been granted access to the facility, the facility management module 212 may issue a command to open a gate or door so the user may enter the facility. In another example, the identification data 224 may be used to determine a payment account or other credentials associated with the user which may then be used in a financial transaction. In yet another example, the identification data 224 may be passed to a facility management module 212.

The facility management module 212 may use the identification data 224 to associate an identity with that user as they move about the facility. For example, the facility management module 212 may use data from cameras or other sensors in the environment to determine a location of the user. Given a known path of the user from the gate, the user identity indicated in the identification data 224 may be associated with the user as they use the facility. For example, the now identified user may walk to a shelf, remove an item, and leave the facility. The facility management module 212 may determine the interaction data indicative of the removal of the item as being associated with the user identifier specified in the identification data 224, and bill an account associated with the user identifier.

The systems and techniques described above are discussed with respect to images of human hands. These systems and techniques may be used with respect to other forms of data, other kinds of objects, and so forth. For example, the input image data 112 may be of faces, overall body of the user, and so forth. In some implementations the system may be used to identify other entities. For example, the system may be used to identify animals such as pets, service animals, and so forth.

The assessment module 202 may have different modes of operation of the system 200 that utilize different threshold values, such as an enrollment mode and an identification mode. The enrollment mode may be used during enrollment to add information about a user that is either new or being updated. The identification mode may be used to attempt to determine the asserted identification data 224 with respect to the enrolled user data 220 of previously enrolled users. The enrollment mode may have a first minimum threshold value for classification value 170, such as "+1". In comparison, the identification mode may have a second minimum threshold for classification value 170 that is less than the first minimum threshold value, such as "0". This capability enables the assessment module 202 to filter the input image data 112 being sent for subsequent processing that is deemed to have a classification value 170 suitable for that use.

As a result, overall system operation is improved. For example, input image data 112 that is inferior in quality is not processed by the embedding network module 204, reducing the utilization of computational resources. In another example, by limiting processing to input image data 112 that has at least a specified minimum quality, the resulting embedding vector data 206 is better suited for comparison by the comparison module 208 or other operations.

In some implementations, a plurality of neural network modules 140, each trained to determine different qualities may be used. These qualities, and their associated sets of ordered classes may be indicative of one or more of: pose of an object (such as a hand 102) with respect to a camera 108 of the scanner 104, tilt of the object with respect to the camera 108, rotation of the object with respect to the camera 108, occlusion of at least a portion of the object by a second object with respect to the camera 108, focus of an image acquired by the camera 108, surface features of at least a portion of a hand depicted in the image acquired by the camera 108, or subcutaneous features of at least a portion of the hand depicted in the image acquired by the camera 108.

In these implementations, a first neural network module 140(1) may be trained to determine first classification values 170 that are indicative of tilt of the hand 104. For example, "unacceptable downward tilt of hand", "acceptable tilt of hand", "unacceptable upward tilt of hand". A second neural network module 140(2) may be trained to determine second classification values 170 that are indicative of illumination such as "uneven dim illumination", "evenly illuminated", "uneven bright illumination". Likewise, a third neural network module 140(3) may be trained to determine third classification values 170 that are indicative "insufficient visibility of subcutaneous features", "acceptable visibility of subcutaneous features", and "good visibility of subcutaneous features". The training data 132 used to train the third neural network module 140(3) may comprise second modality image data 116.

Continuing this implementation, the assessment module 202 may compare the classification values 170 from the different neural network modules 140 that are associated with the input image data 112. The assessment module 202 may specify a minimum classification value 170 for each neural network module 140 in use. If input image data 112 has classification values 170 for those associated neural network modules 140 that exceed the associated minimum classification value 170, the input image data 112 may be provided to the embedding network module 204. For example, the input image data 112 may need to be associated with a first classification value 170(1) that is greater than a first threshold, a second classification value 170(2) that is greater than a second threshold, a third classification value 170(3) that is greater than a third threshold, and so forth.

Figure 3:
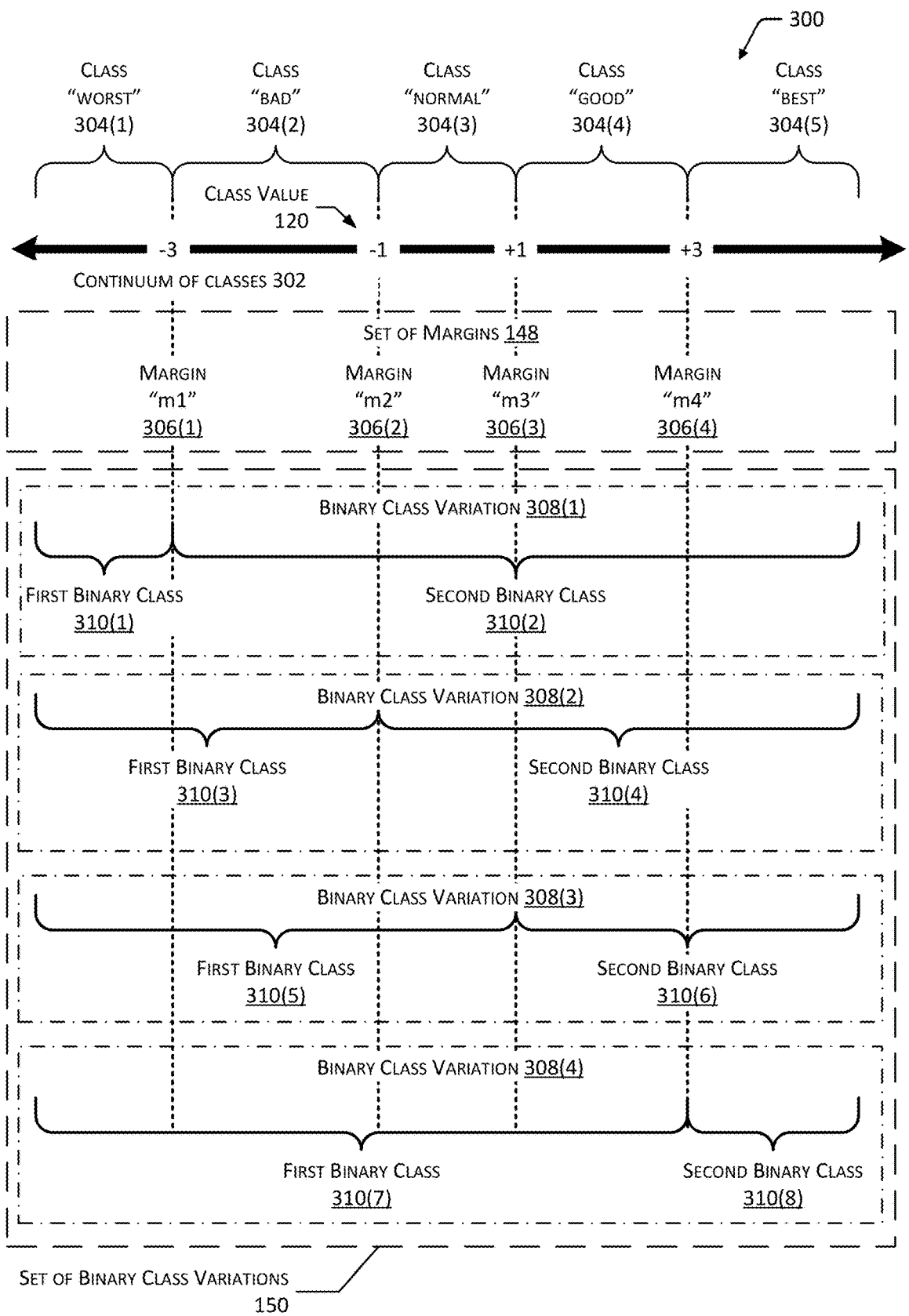
FIG. 3 depicts a continuum of classes, the classes, margins between those classes, and associated binary class variations used by the OBCE loss function, according to some implementations.

FIG. 3 depicts at 300 aspects of the system 100 that are associated with the OBCE loss function 146.

By way of illustration, and not necessarily as a limitation, the OBCE loss function 146 is described with respect to classes that are indicative of quality of input image data 112. The OBCE loss function 146 may be used to train a neural network to provide other classes that are associated with other types of input data. For example, the OBCE loss function 146 may use classes of "noisy", "acceptable", "clear" with respect to input data representative of audio. In another example, the OBCE loss function 146 may use classes of "unusably underexposed", "underexposed", "properly exposed", "overexposed but usable", "unusably overexposed" with respect to input data indicative of images.

Also by way of illustration, and not necessarily as a limitation, five classes are depicted. In other implementations other counts of a plurality of classes may be used. For example, the system 200 may utilize three classes, seven classes, forty two classes, and so forth.

An ordered continuum of classes 302 is depicted. In this illustration five classes are specified {"worst"; "bad"; "normal"; "good"; "best"}. The continuum is considered ordered in that the relative location within the continuum is deemed to convey useful information. One characteristic of the ordering is that adjacent classes 304 may be considered to be more similar than non-adjacent classes 304. As the distance within the continuum of classes 302 between non-adjacent classes 304 increases, the extent of this similarity lessens.

The set of margins 148 is shown that specifies margins 306. Each margin 306 specifies a boundary between two classes 304 that are adjacent to one another in the continuum of classes 302. For example, margin "m1" 306(1) is at the boundary between class "worst" 304(1) and class "bad" 304(2). Continuing the example, margin "m2" 306(2) is at the boundary between class "bad" 304(2) and class "normal" 304(3). Each margin 306 may be associated with a particular classification value within the continuum of classes 302. Each class 304 may be characterized as a range specified by a pair of classification values of two margins 306 within the continuum of classes 302.

The relative "width" of classes 304 may vary from class to class. For example, class "normal" 304(3) may have a range that extends from −1 to +1, while class "best" 304(5) is any value greater than +3. The relative arrangement of margins 306 need not be symmetric with respect to any specific value of the continuum of classes 302. For example, margin "m1" 306(1) may be at −5 while margin "m4" 306(4) may be located at +2. In some implementations the margins 306 may be specified by the class data 118.

During operation of the OBCE loss function 146, the set of margins 148 are used to determine a set of binary class variations 150. Each binary class variation 308 consists of a first binary class 310 and a second binary class 310. In some implementations, each binary class variation 308 is representative of the entirety of the continuum of classes 302.

As illustrated in FIG. 3, with 5 classes and 4 margins, the set of binary class variations 150 consists of four possible binary class variations 308(1)-(4). Binary class variation 308(1) consists of a first binary class 310(1) and a second binary class 310(2) that are separated at the margin "m1" 306(1). Binary class variation 308(2) consists of a first binary class 310(3) and a second binary class 310(4) that are separated at the margin "m2" 306(2). Binary class variation 308(3) consists of a first binary class 310(5) and a second binary class 310(6) that are separated at the margin "m3" 306(3). Binary class variation 308(4) consists of a first binary class 310(7) and a second binary class 310(8) that are separated at the margin "m4" 306(4).

During operation of the OBCE loss function 146 during training, a separate intermediate loss value 152 may be calculated for each of the binary class variations 308. In one implementation the resulting set of intermediate loss values 152 may be summed to determine the loss value 154.

Figure 4:
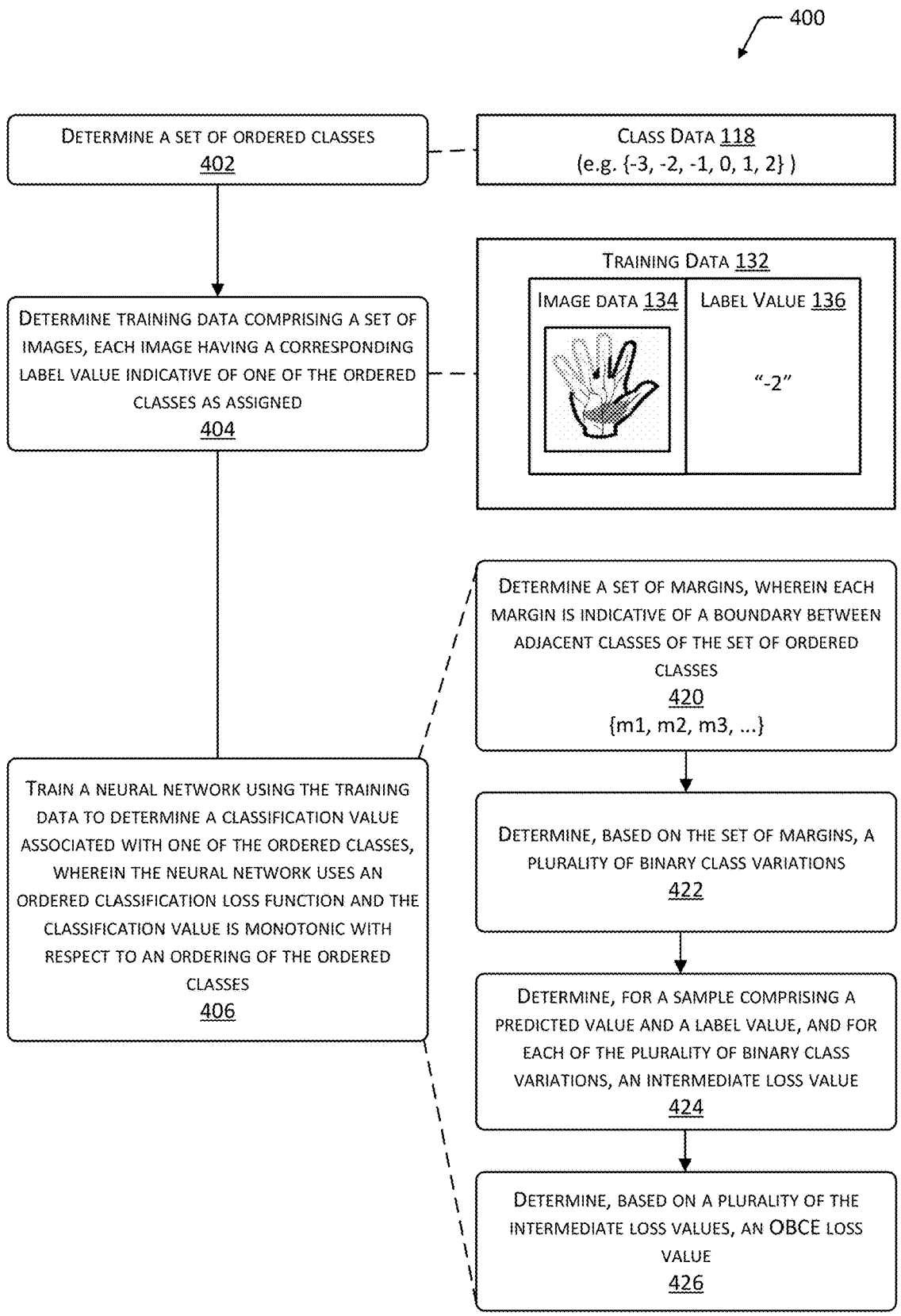
FIG. 4 is a flow diagram of a process to train a neural network using the OBCE loss function, according to some implementations.

FIG. 4 is a flow diagram 400 of a process to train the neural network of the neural network module 140 using the OBCE loss function 146, according to some implementations. The process may be implemented at least in part by executing instructions on one or more of a processor of the computing device 106 within the scanner 104, on another computing device such as a server or group of servers accessible via a network, or a combination thereof.

At 402 a set of ordered classes is determined. For example, the class data 118 may specify three or more classes 304.

At 404 training data 132 is determined that comprises a set of input data and associated labels. For example, the training data 132 comprises a plurality of samples, such as image data 134(1)-(N) and associated label values 136(1)-(P). In some implementations, the label values 136 may be determined using a type 2 annotation process. The training data 132 may thus comprise a set of images, each image having a corresponding label value 136 that is indicative of one of the ordered classes as assigned by an annotator.

At 406 a neural network is trained using the training data 132 to determine a classification value 170. During training, an ordered classification loss function 160, such as the OBCE loss function 146 as described with regard to Equation 1 may be used. At the conclusion of training, trained network data 156 has been determined. For example, the trained network data 156 may be indicative of one or more values, such as weights, of one or more nodes 142 in the neural network.

The classification value 170 determined by the neural network is associated with or indicative of one of the ordered classes. For example, the classification value 170 may comprise a value that is between margins 306 that designate a particular class 304. As described above, the classification value 170 is monotonic with respect to the ordering of the ordered classes in the continuum of classes 302. For example, a classification value 170 corresponding to "worst" is numerically less than a classification value 170 corresponding to "best".

During training, the OBCE loss function 146 may perform one or more of the operations described with respect to 420-426. At 420 a set of margins 148 are determined. Each margin 306 is indicative of a boundary between adjacent classes in the set of ordered classes in the continuum of classes 302.

At 422, based on the set of margins 148, a plurality of binary class variations 308 are determined. For example, a set of binary class variations 150 are determined comprising the plurality of binary class variations 308.

At 424, for a sample comprising a predicted value 144 and a label value 136, and for each for the plurality of binary class variations 308 in the set of binary class variations 150, an intermediate loss value 152 is determined. Returning to the example of FIG. 3, four intermediate loss values 152(1)-(4) are determined, one for each of the binary class variations 308.

At 426, based on the plurality of intermediate loss values 152, the loss value 154 is determined. For example, the OBCE loss value 146 may comprise a sum of the plurality of intermediate loss values 152. In another example, a weighted sum of the plurality of intermediate loss values 152 may be used to determine the loss value 154.

In other implementations, another ordered classification loss function 160 may be used. For example, the order-constrained Softmax loss function 158 may be used.

Figure 5:
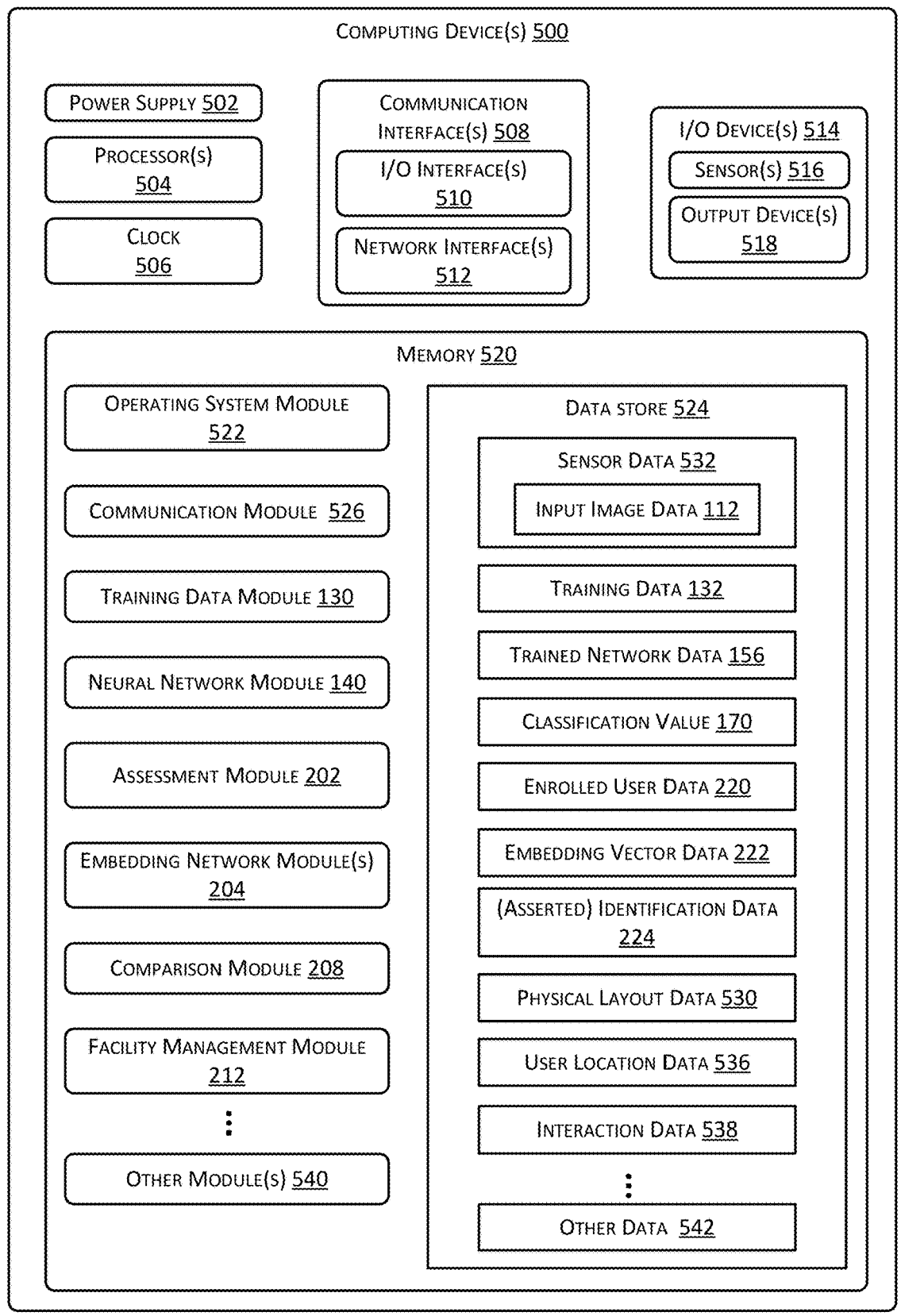
FIG. 5 is a block diagram of a computing device to train the neural network using the OBCE loss function, according to some implementations.

FIG. 5 is a block diagram of a computing device 500 to train a neural network using the OBCE loss function 146, according to some implementations. The computing device 500 may be within the scanner 104, may comprise a server, and so forth. The computing device 500 may be physically present at the facility, may be accessible by a network, or a combination of both. The computing device 500 does not require end-user knowledge of the physical location and configuration of the system that delivers the services. Common expressions associated with the computing device 500 may include "embedded system", "on-demand computing", "software as a service (SaaS)", "platform computing", "network-accessible platform", "cloud services", "data centers", and so forth. Services provided by the computing device 500 may be distributed across one or more physical or virtual devices.

One or more power supplies 502 may be configured to provide electrical power suitable for operating the components in the computing device 500. The one or more power supplies 502 may comprise batteries, capacitors, fuel cells, photovoltaic cells, wireless power receivers, conductive couplings suitable for attachment to a power source such as provided by an electric utility, and so forth. The computing device 500 may include one or more hardware processors 504 (processors) configured to execute one or more stored instructions. The processors 504 may comprise one or more cores. One or more clocks 506 may provide information indicative of date, time, ticks, and so forth. For example, the processor 504 may use data from the clock 506 to associate a particular interaction with a particular point in time.

The computing device 500 may include one or more communication interfaces 508 such as input/output (I/O) interfaces 510, network interfaces 512, and so forth. The communication interfaces 508 enable the computing device 500, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 516, keyboard, mouse, scanner, and so forth. The I/O devices 514 may also include output devices 518 such as one or more of a display device, printer, audio speakers, and so forth. In some embodiments, the I/O devices 514 may be physically incorporated with the computing device 500 or may be externally placed. The sensors 516 may comprise the camera 108, smartcard readers, touch sensors, microphones, and so forth.

The network interfaces 512 may be configured to provide communications between the computing device 500 and other devices, such as routers, access points, and so forth. The network interfaces 512 may include devices configured to couple to personal area networks (PANS), local area networks (LANs), wireless local area networks (WLANS), wide area networks (WANs), and so forth. For example, the network interfaces 512 may include devices compatible with Ethernet, Wi-Fi, Bluetooth, and so forth.

The computing device 500 may also include one or more buses or other internal communications hardware or software that allow for the transfer of data between the various modules and components of the computing device 500.

As shown in FIG. 5, the computing device 500 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the computing device 500. A few example functional modules are shown stored in the memory 520, although the same functionality may alternatively be implemented in hardware, firmware, or as a system on a chip (SoC).

The memory 520 may include at least one operating system (OS) module 522. The OS module 522 is configured to manage hardware resource devices such as the I/O interfaces 510, the I/O devices 514, the communication interfaces 508, and provide various services to applications or modules executing on the processors 504. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 526 may be configured to establish communications with the computing device 106, servers, or other computing devices 500, or other devices. The communications may be authenticated, encrypted, and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including the computing devices 500, network attached storage devices, and so forth.

The data store 524 may store one or more of the input image data 112, training data 132, trained network data 156, classification value(s) 170, enrolled user data 220, embedding vector data 222, asserted identity data 224, and so forth. The memory 520 may store the training data module 130, the one or more neural network modules 140, the assessment module 202, the one or more embedding network module(s) 204, the comparison module 208, the facility management module 212, and so forth.

The facility management module 212 may perform various functions, such as tracking items between different inventory locations, to and from carts, generating restocking orders, directing operation of robots within the facility, using the (asserted) identity data 224 to associate a particular user identity with a user in the facility, and so forth. During operation, the facility management module 212 may access sensor data 532 such as input image data 112, or data from other sensors.

Information used by the facility management module 212 may be stored in the data store 524. For example, the data store 524 may be used to store physical layout data 530, sensor data 532, (asserted) identity data 224, user location data 536, interaction data 538, and so forth. For example, the sensor data 532 may comprise the input image data 112 obtained from a scanner 104 associated with the facility.

The physical layout data 530 may provide information indicative of where scanners 104, cameras, weight sensors, antennas for radio receivers, inventory locations, and so forth are in the facility with respect to one another. For example, the physical layout data 530 may comprise information representative of a map or floor plan of the facility with relative positions of gates with scanners 104 and inventory locations.

The facility management module 212 may generate the user location data 536 that is indicative of the location of the user within the facility. For example, the facility management module 212 may use image data obtained by the cameras to determine a location of the user. In other implementations, other techniques may be used for determining the user location data 536. For example, data from a smart floor may be used to determine the location of the user.

Identification data 224 may be associated with user location data 536. For example, the user enters the facility and has their hand 102 scanned by the scanner 104, resulting in (asserted) identification data 224 that is indicative of their time of entry and the scanner 104 associated with where they entered. The user location data 536 indicative of a path of a user that begins at the scanner 104 at the time of entry may be associated with the user identifier in the (asserted) identification data 224.

Based on the user location data 536 and the interaction data 538, a particular interaction may be associated with an account of a particular user. For example, if the user location data 536 indicates that the user is present in front of inventory location 492 at time 17:47:20 and the interaction data 538 indicates a pick of a quantity of one item from an area on inventory location 492 at 17:47:27, the user may be billed for that pick.

The facility management module 212 may use the sensor data 532 to generate the interaction data 538. The interaction data 538 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 212 may generate interaction data 538 that indicates what item the user picked from a particular lane on a shelf, and then use this interaction data 538 to adjust the count of inventory stowed at that lane. The interaction data 538 may then be used to bill an account associated with the user identifier that is associated with the user who picked the item.

The facility management module 212 may process the sensor data 532 and generate output data. For example, based on the interaction data 538, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 540 may also be present in the memory 520 as well as other data 542 in the data store 524. For example, a billing module may use the interaction data 538 and the (asserted) identification data 224 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the (asserted) identification data 224. In another example, a robot may incorporate a scanner 104. The robot may use the (asserted) identification data 224 to determine whether to deliver a parcel to the user, and based on the (asserted) identification data 224, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a memory, storing first computer-executable instructions; and
    a hardware processor to execute the first computer-executable instructions to:
        determine a set of ordered classes, wherein the set of ordered classes is indicative of a continuum of classes;
        determine training data comprising a plurality of samples, wherein each sample of the plurality of samples comprises input data and a corresponding label value indicative of one of the ordered classes of the set of ordered classes; and
        train, using the training data and an ordered classification loss function, a neural network to determine a first value associated with a first ordered class of the set of ordered classes.

2. The system of claim 1, wherein the ordered classification loss function comprises instructions to:
    determine a set of margins, wherein each margin of the set of margins is indicative of a boundary between adjacent classes of the set of ordered classes;
    determine, based on the set of margins, a plurality of binary class variations;
    determine, for the each sample, a predicted value that is indicative of a second ordered class of the set of ordered classes;
    determine, based on the predicted value and the corresponding label value that is associated with the second ordered class, a plurality of intermediate loss values, wherein each intermediate loss value of the plurality of intermediate loss values is associated with a binary class variation of the plurality of binary class variations;
    determine, based on the plurality of the intermediate loss values, a loss value; and
    the system further comprising instructions to:
    determine that one or more values of the neural network are modified based at least in part on the loss value.

3. The system of claim 1, wherein the ordered classification loss function comprises instructions to:
    determine a set of margins, wherein each margin of the set of margins is indicative of a boundary between adjacent classes of the set of ordered classes;
    determine, based on the set of margins, a plurality of binary class variations, wherein each binary class variation of the plurality of binary class variations comprises a first binary class and a second binary class;
    determine, for the each sample, a plurality of intermediate loss values, wherein each intermediate loss value of the plurality of intermediate loss values comprises a binary cross-entropy loss value for each of the binary class variations;
    determine, based on the plurality of intermediate loss values, a loss value associated with the each sample; and
    the system further comprising instructions to:
    determine that one or more values of the neural network are modified based at least in part on the loss value.

4. The system of claim 1, wherein the continuum of classes is ordered, and further wherein the first value is monotonic with respect to location within the continuum.

5. The system of claim 1, wherein the ordered classification loss function comprises instructions to:

determine a set of margins, wherein each margin of the set of margins is indicative of a boundary between adjacent classes of the set of ordered classes; and determine, based on the set of margins, a plurality of binary class variations wherein each binary class variation of the plurality of binary class variations comprises a first binary class and a second binary class, and wherein the first binary class and the second binary class include the set of ordered classes.

6. The system of claim 1, wherein the set of ordered classes are indicative of one or more of:
pose of an object with respect to a camera,
tilt of the object with respect to the camera,
rotation of the object with respect to the camera,
occlusion of at least a portion of the object by a second object with respect to the camera,
focus of an image acquired by the camera,
surface features of at least a portion of a hand depicted in the image acquired by the camera, or
subcutaneous features of at least a portion of the hand depicted in the image acquired by the camera.

7. The system of claim 1, wherein each ordered class of the set of ordered classes is specified by a range of first values.

8. The system of claim 1, wherein the input data comprises a first image and a second image; and further wherein:
the first image depicts surface features of at least a portion of a palm; and
the second image depicts subcutaneous features of the at least a portion of the palm.

9. The system of claim 1, the hardware processor to execute the first computer-executable instructions to:
receive a query image;
determine a second value of the query image using the neural network that is utilizing the training data;
determine that the second value is greater than or equal to a threshold value; and
responsive to the second value being greater than or equal to the threshold value, send the query image to a second neural network, wherein the second neural network determines embedding vector data representative of the query image.

10. A method comprising:
determining a set of ordered classes, wherein the set of ordered classes specifies an ordered continuum of classes;
accessing training data comprising a plurality of samples, wherein each sample of the plurality of samples comprises input data and a corresponding label value indicative of one of the ordered continuum of classes; and
determining one or more values associated with a first ordered class of the set of ordered classes through operation of a neural network based on a loss value calculated using an ordered classification loss function.

11. The method of claim 10, further comprising:
determining a set of margins, wherein each margin of the set of margins is indicative of a boundary between adjacent classes of the set of ordered classes;
determining, for a sample of the plurality of samples, a predicted value that is within the ordered continuum of classes; and
the ordered classification loss function comprising:
determining, based on the set of margins, a plurality of binary class variations;
determining, based on the predicted value and the corresponding label value that is associated with the ordered continuum of classes, a plurality of intermediate loss values, wherein each intermediate loss value of the plurality of intermediate loss values is associated with a binary class variation of the plurality of binary class variations; and
determining, based on the plurality of the intermediate loss values, the loss value.

12. The method of claim 10, further comprising:
determining a set of margins, wherein each margin of the set of margins is indicative of a boundary between adjacent classes of the set of ordered classes;
determining, for a sample of the plurality of samples, a predicted value that is within the ordered continuum of classes; and
the ordered classification loss function comprising:
determining, based on the set of margins, a plurality of binary class variations, wherein each binary class variation of the plurality of binary class variations consists of a first binary class and a second binary class;
determining, for the each sample of the plurality of samples, a plurality of intermediate loss values, wherein each intermediate loss value of the plurality of intermediate loss values comprises a binary cross-entropy loss value for each of the binary class variation of the plurality of binary class variations; and
determining, based on the plurality of intermediate loss values, the loss value associated with the sample.

13. The method of claim 10, wherein the loss value is monotonic with respect to location within the ordered continuum.

14. The method of claim 10, further comprising:
determining a set of margins, wherein each margin of the set of margins is indicative of a boundary between adjacent classes of the set of ordered classes; and
the ordered classification loss function comprising:
determining, based on the set of margins, a plurality of binary class variations, wherein each binary class variation of the plurality of binary class variations consists of first binary class and a second binary class, and wherein the first binary class and the second binary class include the set of ordered classes.

15. The method of claim 10, wherein the input data comprises one or more of:
a first image of a first palm acquired using a first modality; or
a second image of the first palm acquired using a second modality.

16. The method of claim 10, wherein the set of ordered classes are indicative of one or more of:
pose of an object with respect to a camera,
tilt of the object with respect to the camera,
rotation of the object with respect to the camera,
occlusion of at least a portion of the object by a second object with respect to the camera,
focus of an image acquired by the camera,
surface features of at least a portion of a hand depicted in the image acquired by the camera, or
subcutaneous features of at least a portion of the hand depicted in the image acquired by the camera.

17. The method of claim 10, further comprising:
accessing a query image;
determining a classification value of the query image using the neural network, wherein the neural network uses the one or more values;

determining the classification value is greater than or equal to a threshold value; and responsive to the classification value being greater than or equal to the threshold value, using a second neural network to determine embedding vector data representative of the query image.

18. The method of claim 10, further comprising:

determining, based on the set of ordered classes, a set of weights, wherein each weight of the set of weights corresponds to a value indicative of a center of an individual class within the ordered continuum of classes; and the ordered classification loss function comprising:

determining a Softmax probability value that a sample of the plurality of samples is associated with an ordered class of the set of ordered classes that is associated with the corresponding label value associated with the sample; and determining the loss value based on the Softmax probability value.

19. A system comprising:

a memory, storing first computer-executable instructions; and a hardware processor to execute the first computer-executable instructions to:

determine a set of ordered classes indicative of a continuum of classes;

determine training data comprising a plurality of samples, wherein each sample of the plurality of samples comprises input data and a corresponding label value indicative of one ordered class of the set of ordered classes; and train, using the training data and an ordered classification loss function, a neural network to determine a first value associated with a first ordered class of the set of ordered classes;

wherein the ordered classification loss function comprises instructions to:

determine a set of margins, wherein each margin of the set of margins is indicative of a boundary between adjacent classes of the set of ordered classes;

determine, based on the set of margins, a plurality of binary class variations;

determine, for a sample of the plurality of samples, a predicted value that is indicative of a second ordered class of the set of ordered classes;

determine, based on the predicted value and the corresponding label value that is associated with the second ordered class, a plurality of intermediate loss values, wherein each intermediate loss value of the plurality of intermediate loss values is associated with a binary class variation of the plurality of binary class variations; and determine, based on the plurality of the intermediate loss values, a loss value associated with the ordered classification loss function.

20. The system of claim 19, wherein the set of ordered classes is indicative of classes with respect to the continuum of classes, and further wherein the first value is monotonic with respect to location within the continuum.

* * * * *